Patented Nov. 1, 1927.

1,647,399

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

PAINT AND VARNISH REMOVER BASE.

No Drawing. Application filed March 29, 1923. Serial No. 628,440.

This invention relates to a paint and varnish remover base in the form of a dry composition or powder containing a caustic alkali and a thickening agent; the proportions of these two essential ingredients being adjusted so that on mingling with water or other suitable aqueous medium an alkaline solution of appropriate strength and adequate consistency is obtained.

1. Alkaline removers have been justly criticized because of destructive action on wood. The growing trend of usage of sheet steel in the manufacture of equipment of various sorts, automobile bodies and the like however makes possible the application of alkaline compositions for removing paint and varnish which if on a wood surface could be removed to better advantage by using a neutral organic solvent waxy-bodied composition.

2. Aqueous alkaline removers are difficult to keep in cans such as those ordinarily used for shipping purposes in the varnish trade as the alkali is liable to corrode the solder and cause the can to leak. Also the bulk of water makes shipping costs high.

3. According to the present invention a dry powder or fragmental mixture containing alkaline material in concentrated form is used as a paint and varnish remover base which is adapted to be diluted with water at the time of use to yield a removing composition of appropriate strength and consistency. Essentially the composition contains as one ingredient a fixed caustic alkali, namely, caustic soda or caustic potash; the latter being somewhat more effective. An alkali fairly free from carbonate is preferred. In any event carbonation by protracted exposure to air is undesirable as the action is weakened.

4. The second essential ingredient is a thickening agent. Starch has been found particularly effective as on the addition of water in the presence of caustic alkali the starch dissolves to make a clear syrupy liquid or a jelly-like mass according to the concentration. The water used to make up the solution preferably at the time of use need not be hot but may be employed at room temperature. This makes the action of preparing the removing composition for actual use a very simple and convenient procedure. The bodying effect of the starch makes possible the application of the remover to vertical and overhead surfaces.

5. Thickeners tend to retard the action of the alkali somewhat but are highly desirable for surfaces not horizontal as an alkaline solution without a thickener freely drips or drains from the surface to which it is applied and may cause much damage to adjacent parts. Since thickeners retard the action the minimum amount of thickening agent preferably should be used to accomplish the removing action effectually. Starch varies greatly in thickening action depending on its origin and the processes to which it has been subjected during preparation. For example some laundry starches make very thin solutions and in order to secure a removing composition of the desired consistency a proportionately large amount of such starch would be required. Corn, wheat and rice starches yield alkaline solutions of the greatest viscosity. Less viscous starches are cassava, arrowroot, potato, sago and various laundry starches. Corn or wheat starches are the most serviceable. These starches which have the relatively higher viscosity may be termed for the purposes of the present invention "stronger starches", meaning thereby that they have a greater thickening or stiffening action in aqueous alkaline solution. It is probable that such starches afford a composition the colloidal state of which permits of greater internal mobility than is the case with some of the more soluble starches when employed to yield solutions of corresponding viscosity.

6. Aqueous solutions of caustic alkalies of 5 to 10 per cent strength are best for the disintegration of coatings of paint and varnish. If the alkaline solution is made highly concentrated, for example 40 per cent, the action is very slow, probably due to the salting out effect upon the saponified material which forms. Doubtless a coating of this saponified substance quickly results on applying such strong solution and this film serves to prevent the further penetration of the alkali. As such solutions are diluted the action will become more rapid and while paint and varnish can be removed by solutions of 15 or 20 per cent strength highly favorable results have been obtained with 5 per cent solutions. As potassium hydroxide or caustic potash is somewhat more expensive than caustic soda but is more effective than the latter it is desirable to use solutions which are as weak in caustic potash as maximum activity permits.

Also there is less danger to the operator in working with weak solutions. On the other hand a solution which is too weak in alkali will lose its efficiency quickly especially on a thick coat of paint or varnish due to the union of the alkali with the paint vehicle before disintegration is complete. A five per cent solution is fairly satisfactory for average coats of paint and varnish, and represents a composition which is cheap to prepare and not so vicious in its action on the person of the operator as more concentrated solutions. Hence the present paint remover base preferably contains the proportion of caustic alkali which is adapted to yield a 5 per cent solution when the base is diluted with water.

7. The consistency of the remover should be such that when applied by brushing it does not drop or run off of vertical surfaces. Thus 1 part by weight of corn or wheat starch or other starch admixed with 2 parts of caustic potash will yield thick viscous liquid on the addition of water sufficient to make the solution of 5 per cent strength in caustic potash. Thicker or thinner mixtures may be made by adding a lesser or greater proportion respectively of starch. Thus for example the proportion of caustic alkali to starch may vary between about 3:1 and 3:2. Thus the proportion of the latter is adjusted to afford adequate spreading qualities on dilution of the composition with water to make a caustic strength of say 5 per cent and preferably for ordinary operations not over 10 per cent.

8. The starch powder and dry caustic potash or caustic soda may be ground together if desired to make an intimate mixture which quickly dissolves on the addition of water to form a bodied or consistent paint and varnish remover. Or the crushed or powdered caustic alkali may be mixed with starch powder in any desired proportions.

9. The keeping qualities of the dry mixture are good and the dry material may be preserved in soldered tin cans without action on the container. Aqueous alkaline solutions containing organic thickeners do not as a rule possess good keeping qualities and hence it is recommended that the aqueous composition be made up as required for use from the dry base. The latter is kept in tightly closed containers in order to avoid conversion of the caustic alkali to carbonated alkali which of course also prevents the caustic from absorbing water from the atmosphere. In using, simply add hot or cold water to the powder or introduce the powder into the water stirring for a few minutes until the alkali has dissolved and ruptured the starch granules making a clear solution having a slight body or a jelly-like consistency or intermediate syrupy or viscous consistency as desired.

10. Various modifications in proportions and ingredients may be made. Other substances may be added or substituted to such an extent as desired (without departing from the range of operative proportions), e. g. trisodium phosphate, powdered soap, casein, gum tragacanth, Irish moss, various mineral fillers, coloring agents, perfuming oils, etc. may be introduced but preferably I employ the very simple composition consisting solely or substantially solely of caustic potash or caustic soda 100 parts by weight to say 50 parts or less of strong starch or a sufficient proportion of the latter such that on the addition of water to make preferably a 5 or 10 per cent solution of caustic alkali, the amount of starch is just sufficient to give the composition an effective consistency.

What I claim is:—

1. A paint and varnish remover base being a composition consisting essentially of about 2 parts of comminuted caustic alkali and about 1 part of strong starch, both being in a pulverulent dry state, such composition being substantially free from added coloring matter capable of objectionably staining wood and such composition being substantially all water-soluble.

2. A paint and varnish remover base in the form of a substantially dry pulverulent composition remaining stable when out of contact with air and consisting substantially of comminuted caustic alkali and strong starch, the amount of the caustic alkali being greater than the amount of starch; the proportion of the starch being adjusted to afford a remover of a syrupy to jelly-like consistency, having adequate spreading qualities and adequate viscosity to be retained upon vertical surfaces, on dilution of the composition with water to make an alkaline strength of about 5 to 10 per cent, such pulverulent composition being substantially free from added coloring matter capable of objectionably coloring wood.

CARLETON ELLIS.